US005617079A

United States Patent [19]
Harrison

[11] Patent Number: 5,617,079
[45] Date of Patent: Apr. 1, 1997

[54] APPARATUS FOR REPLACING A BATTERY IN A BATTERY POWERED DEVICE

[76] Inventor: Frank Harrison, P.O. Box 411824, Kansas City, Mo. 64141

[21] Appl. No.: 614,243

[22] Filed: Mar. 12, 1996

[51] Int. Cl.⁶ ..................................................... G08G 1/01
[52] U.S. Cl. .......................... 340/693; 340/628; 340/636; 429/96; 429/100
[58] Field of Search .................................... 340/693, 628, 340/636; 429/96, 1, 100; 381/69, 69.2

[56] References Cited

U.S. PATENT DOCUMENTS

| | | | |
|---|---|---|---|
| 3,979,664 | 9/1976 | Harris | 324/122 |
| 4,138,531 | 2/1979 | Thompson | 429/98 |
| 4,152,551 | 5/1979 | Hiller | 381/69 |
| 4,313,110 | 1/1982 | Subulak et al. | 340/628 |
| 4,383,251 | 5/1983 | Perelli et al. | 340/628 |
| 4,679,037 | 7/1987 | Bryan et al. | 340/693 |
| 5,149,038 | 9/1992 | VanCleve | 340/628 |
| 5,281,954 | 1/1994 | Harrison et al. | 340/693 |

*Primary Examiner*—Jeffery Hofsass
*Assistant Examiner*—Daniel J. Wu
*Attorney, Agent, or Firm*—Hovey, Williams, Timmons & Collins

[57] ABSTRACT

An apparatus 10 for replacing a battery 12 in a battery powered detection device 14 is disclosed. The apparatus 10 includes a battery housing 18 attached to the detection device 14 for receiving a battery 12 therein and structure for inserting and removing the battery 12 in the battery housing 18. The inserting and removing structure includes an elongated rod 20 and a battery carriage 22 attached to one end of the rod 20 for carrying a battery 12. The battery housing 18 presents a side opening 32 for receiving the battery carriage 22 for permitting a battery 12 to be attached to or removed from the battery connector 16.

12 Claims, 2 Drawing Sheets

Fig. 1.

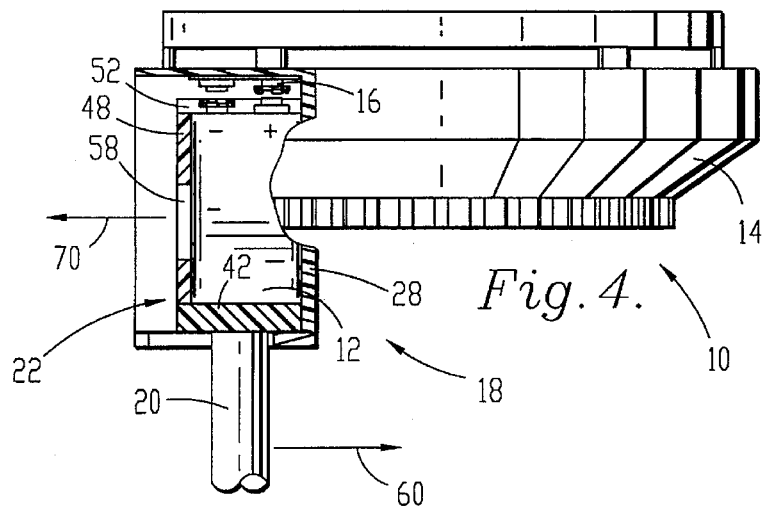
Fig.4.
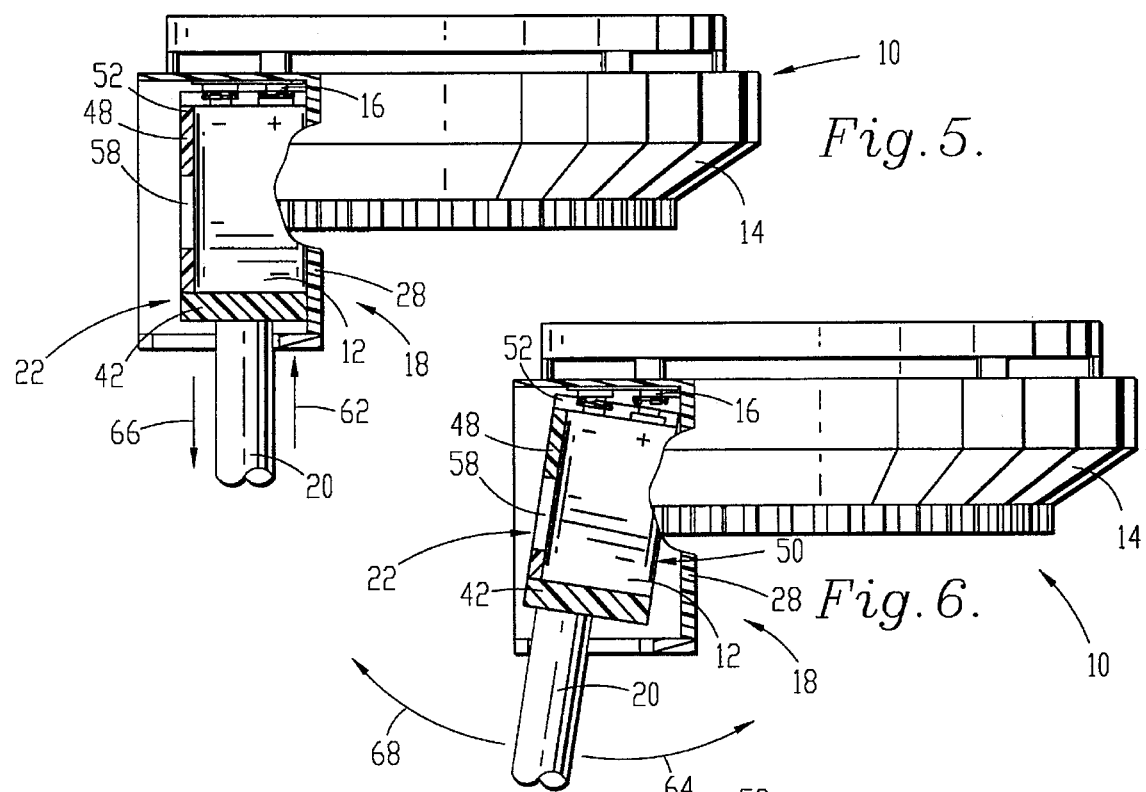
Fig.5.
Fig.6.
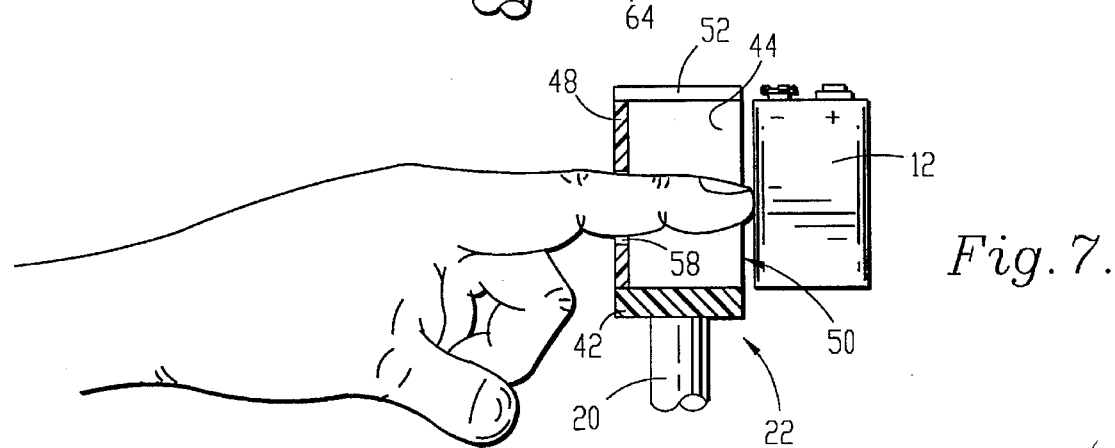
Fig.7.

APPARATUS FOR REPLACING A BATTERY IN A BATTERY POWERED DEVICE

BACKGROUND OF THE INVENTION

1. Field of the Invention

The present invention relates to battery powered devices, and more particularly to an apparatus for replacing a battery in a battery powered device.

2. Description of the Prior Art

Battery powered detection devices such as smoke alarms, carbon monoxide sensors and other gas sensors are commonly installed in buildings to detect the presence of fire, smoke, or gas and to provide an alarm signal in response thereto. These detection devices are typically powered by a conventional 9 volt battery and are mounted on or near the ceiling of the building so that they provide early detection of rising smoke, fire, and/or gas. Unfortunately, the placement of a detection device on or near the ceiling places it out of reach and makes it difficult to test and replace its battery.

Devices for replacing a battery in a ceiling-mounted detection device are known in the art. For example, U.S. Pat. No. 5,281,954 (the '954 patent), owned by the Applicant of the present invention and hereby incorporated by reference, discloses a device for replacing a battery in a smoke alarm including a guide track and a battery carriage shiftable along the guide track. A battery is placed in the battery carriage and then shifted up through the guide track for connection to the battery connector of the smoke alarm.

Although the '954 patent provides a greatly improved device and method for replacing batteries in a ceiling mounted smoke alarm, its guide track is somewhat complicated and expensive to manufacture, install and use. Thus, there is a need for an improved apparatus for replacing a battery in a battery powered detection device that is inexpensive to manufacture and easy to install and use.

SUMMARY OF THE INVENTION

In view of the limitations of the prior art discussed above, the present invention provides an improved apparatus for replacing the battery in a ceiling-mounted detection device. The apparatus of the present invention broadly includes a battery housing for receiving a battery therein and structure for inserting and removing the battery in the battery housing.

The battery housing preferably depends from the casing of the detection device and is adjacent and partially encloses the battery connector of the detection device. The battery housing presents a battery-receiving side opening for receiving the battery inserting and removing structure. The battery housing can be manufactured as an integral part of the detection device or may be designed for addition to an existing detection device.

The inserting and removing structure is formed separate from the battery housing and includes an elongated rod and a battery carriage attached to one end of the rod. The rod may be sized to accommodate any ceiling height and preferably presents a hole on its end opposite the carriage for hanging the rod on a hook or hanger. The battery carriage presents a battery-carrying chamber for carrying a battery that is to be inserted into or removed from the battery housing. The battery carriage is sized and adapted for sliding in and out of the side opening of the battery housing for permitting a battery to be inserted and removed from the battery connector.

By constructing an apparatus for replacing a battery in a battery powered device as described herein, numerous advantages are realized. For example, the apparatus permits a person to easily insert or remove a battery from a ceiling-mounted detection device without the use of a ladder or chair. Thus, the apparatus makes it easier, faster and safer to replace a battery in a detection device and thus encourages people to replace the batteries in their detection devices more frequently. The apparatus is especially suited for the elderly or handicapped who have difficulty standing on chairs and ladders.

Additionally, since the rod and battery carriage are formed separate from the battery housing, they need not be permanently mounted to the ceiling or wall near the detection device as in prior art devices. Once a battery has been inserted or removed from the battery housing, the rod and battery carriage can be easily stored by hanging it in any convenient location.

A further advantage of the present invention is that it does not require a great deal of additional hardware to be added to the detection device. Thus, the apparatus is inexpensive to manufacture, and the detection device to which it is attached maintains the appearance of a conventional detection device.

BRIEF DESCRIPTION OF THE DRAWING FIGURES

A preferred embodiment of the present invention is described in detail below with reference to the attached drawing figures, wherein:

FIG. 4 is a side elevational view of the apparatus illustrating the insertion of a battery into and the removal of a battery from the battery housing;

FIG. 5 is a side elevational view of the apparatus illustrating the connection or disconnection of a battery from the battery connector of the detection device;

FIG. 6 is a side elevational view of the apparatus illustrating an alternate manner of connecting or disconnecting a battery from the battery connector of the detection device; and FIG. 7 is a side sectional view of the battery carriage illustrating the removal of a battery from the battery carriage.

DETAILED DESCRIPTION OF THE PREFERRED EMBODIMENTS

Figures 1, 2, 3:
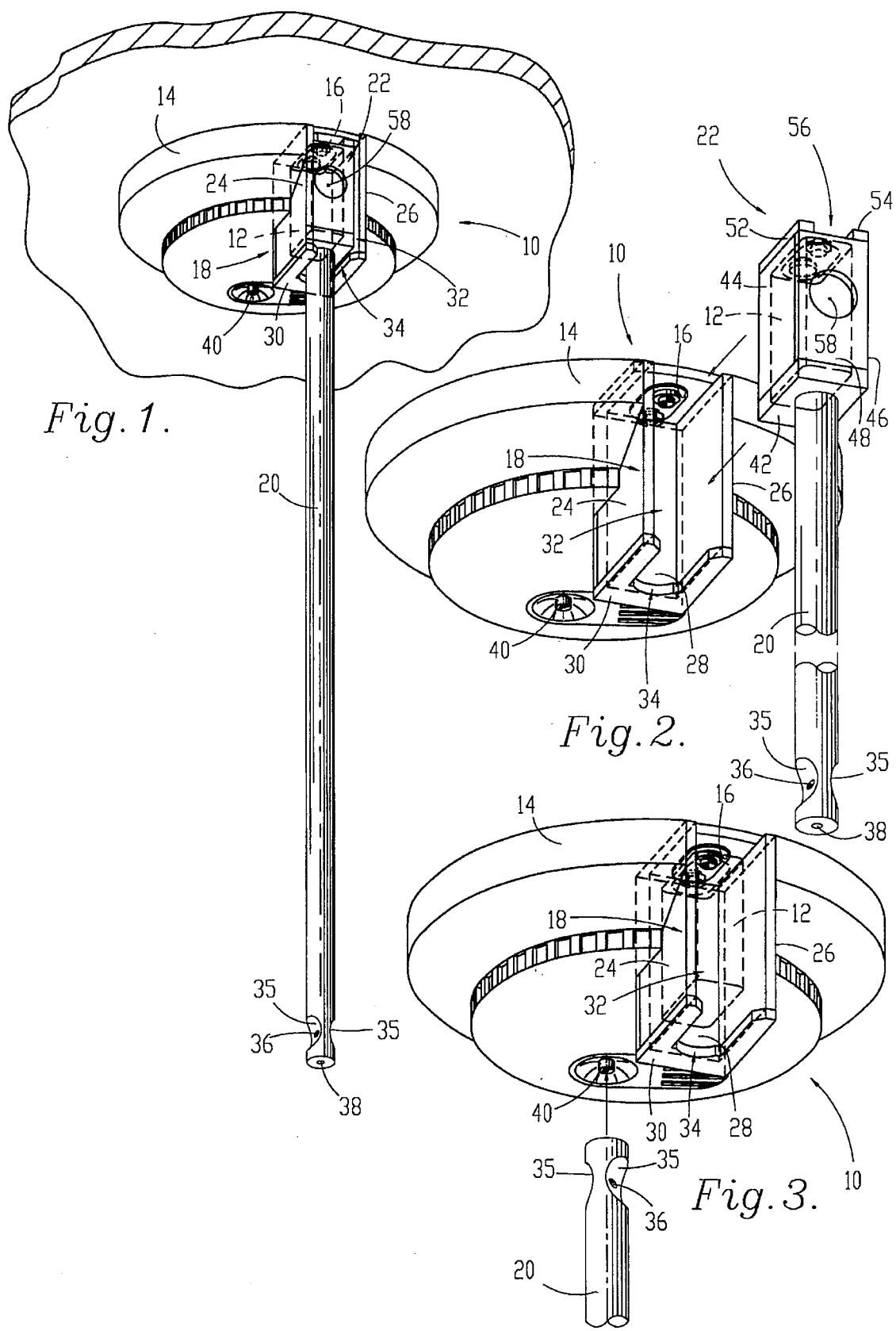
FIG. 1 is a perspective view of an apparatus for replacing a battery in a battery powered device constructed in accordance with a preferred embodiment of the present invention with the detection device shown mounted to a ceiling.
FIG. 2 is a perspective view of the apparatus illustrating the insertion of a battery into the detection device.
FIG. 3 is a perspective view of the apparatus illustrating the use of the elongated rod for testing the operation of the detection device.

Turning now to FIG. 1, an apparatus 10 for replacing a battery 12 in a battery powered detection device 14 constructed in accordance with a preferred embodiment of the invention is illustrated. The apparatus 10 may be used with any battery powered detection device such as a smoke detector, carbon monoxide detector, or other gas sensor that is mounted on a ceiling or wall. The apparatus 10 may also be used with other ceiling-mounted devices such as battery powered lights and signs.

An example of a detection device that may be used in conjunction with the present invention is a First Alert™ Model SA 90LT Smoke Detector manufactured by the Pittway Corporation of Aurora, Ill. An example of a battery for powering the detection device is an Energizer™ 9 volt longlife alkaline manufactured by Eveready Battery Company of St. Louis, Mo.

The detection device 14 is modified to include an exposed battery connector 16 mounted to the casing of the detection device 14 and electrically coupled with the electronics of the detection device 14. The battery connector 16 may also be mounted directly to the ceiling or wall adjacent the detection device 14.

The apparatus 10 broadly includes a battery housing 18 for receiving the battery 12 therein and structure for inserting and removing the battery 12 in the battery housing 18. As best illustrated in FIG. 2, the inserting and removing structure broadly includes an elongated rod 20 and a battery carriage 22 attached to one end of the rod 20.

In more detail, the battery housing 18 is positioned adjacent the battery connector 16 and may be manufactured as an integral part of the detection device 14 or may be designed for addition to an existing detection device. The battery housing 18 preferably depends from the casing of the detection device 14 and partially encloses the battery connector 16. The battery housing 18 is preferably formed from the same synthetic resin materials as the casing of the detection device 14 and may be glued or otherwise attached to the casing of the detection device 14 or integrally formed with the casing.

As best illustrated in FIGS. 2 and 3, the battery housing 18 includes a pair of spaced-apart depending sidewalls 24,26, a depending endwall 28, a bottom wall 30, and a battery-receiving side opening 32. The sidewalls 24,26 and endwall 28 define an open chamber sized for receiving a battery to be connected to the battery connector 16. As described in more detail below, the battery housing 18, and particularly the side opening 32, is sized slightly larger than a conventional 9 volt battery to permit the battery carriage 22 to transversely slide in and out of the battery housing 18.

The bottom wall 30 of the battery housing 18 presents a slot or channel 34 extending from the side opening 32 towards the endwall 28. As described in more detail below, the slot 34 permits the elongated rod 20 of the battery inserting and removing structure to pass therethrough for permitting the battery carriage 22 to slide in and out of the side opening 32 of the battery housing 18.

The rod 20 is preferably formed of wood, synthetic resin or other suitable materials and can be sized to accommodate any ceiling height. In one construction, the rod 20 is approximately 1–2 feet in length for use with detection devices mounted to conventional 8–9 feet ceilings.

As illustrated in FIGS. 2 and 3, the end of the rod 20 remote from the battery carriage 22 presents a pair of recessed regions 35 having a hole 36 extending therebetween transverse to the rod's 20 longitudinal axis. The hole 36 is provided for receiving a hook or hanger for hanging the rod 20 when not in use. The end of the rod 20 remote from the battery carriage 22 also presents an indented region 38 adapted for engaging and surrounding the tip of the detection device test button 40. With this construction, the rod 20 can be used to depress the test button 40 as illustrated in FIG. 3 for testing the battery strength of the detection device 14.

The battery carriage 22 is attached to the end of the rod 20 opposite the hole 36 and indented region 38 and is provided for carrying a battery that is to be connected to the battery connector 16 or removed from the battery connector 16. The battery carriage 22 is preferably formed of the same synthetic resin material as the battery housing 18, but may also be formed of other suitable materials.

As best illustrated in FIG. 2, the battery carriage 22 includes a base 42, a pair of upstanding, spaced-apart sidewalls 44,46 an upstanding endwall 48, and an open endwall 50 (see FIG. 7). The base 42 preferably includes a hole adapted for receiving the end of the rod 20 for attaching the battery carriage 22 thereto. The end of the rod 20 is preferably glued in the hole, but may also be secured thereto by other conventional fastening means.

The sidewalls 44,46 and endwall 48 of the battery carriage 22 define a battery-carrying chamber for carrying a battery that is to be inserted into or removed from the battery housing 18. The battery-carrying chamber is configured for snugly receiving a conventional 9 volt battery for securely retaining the battery 12 therein. As described in more detail below, this permits the terminals of the battery 12 to extend from the top of the carriage 22 and prevents the battery 12 from shifting vertically along the longitudinal axis of the carriage 22 while the battery is being removed from the battery connector 16.

The battery carriage 22 is also sized and adapted for sliding in and out of the side opening 32 of the battery housing 18 for permitting a battery 12 to be inserted and removed from the battery connector 16. As best illustrated in FIGS. 4 and 5, the battery housing 18 is slightly longer than the battery carriage 22, thus permitting the carriage 22 to be shifted up and down slightly while it is in the battery housing 18.

Returning to FIG. 2, the battery carriage 22 also includes a pair of retaining lips 52,54 attached to the upper ends of the sidewalls 44,46. The retaining lips 52,54 define an open slot 56 extending across the upper end of the carriage 22 between the endwall 48 and the open endwall 50 for exposing the terminals of the battery 12 carried in the carriage 22. The slot 56 permits the terminals of a battery carried in the battery carriage 22 to extend out of the battery carriage 22 for facilitating their connection to the battery connector 16 while the battery 12 is still in the carriage 22. The slot 56 also permits the battery carriage 22 to be moved out of the side opening 32 of the battery housing 18 after the battery 12 has been connected to the battery connector 16.

Referring to FIG. 7, the endwall 48 of the battery carriage 22 presents a hole 58 therein that provides access to the battery-carrying chamber. The hole 58 permits a person to insert his or her finger into the battery-carrying chamber for dislodging a battery from the battery carriage 22 after it has been removed from the battery housing 18.

In use, the apparatus 10 permits a person to easily and quickly insert a battery 12 into the battery housing 18 and to connect the terminals of the battery 12 to the battery connector 16. As illustrated in FIG. 2, a battery is first placed in the battery carriage 22, and the rod 20 is maneuvered so that the battery carriage 22 is adjacent the side opening 32 of the battery housing 18. Then, the battery carriage 22 is slid through the side opening 32 of the battery housing 18 as indicated by the arrow 60 in FIG. 4.

Next, the rod 20 and battery carriage 22 are pushed upwards to connect the exposed battery terminals to the battery connector 16 as illustrated by the arrow 62 in FIG. 5. Alternatively, one terminal of the battery 12 can be placed on a corresponding connector of the battery connector 16 and the battery carriage 22 can be pivoted into the battery housing 18 as illustrated by the arrow 64 in FIG. 6 for connecting the battery 12 to the battery connector 16. Once the battery 12 is connected to the battery connector 16, the slot 56 on the upper end of the battery carriage 22 permits the battery carriage 22 to be slid out of the battery housing 18 without disconnecting the battery 12 from the battery connector 16.

The apparatus 10 can also be used to remove a battery from the battery housing 18. In this procedure, the battery carriage 22 is first slid through the side opening 22 in the battery housing 18 and over the battery connected to the battery connector 16. The slot 56 on the upper end of the battery carriage 22 permits the battery carriage 22 to be slid over the battery 12 even though the battery 12 is still connected to the battery connector 16.

Then, the rod 20 is pulled downward to disconnect the battery terminals from the battery connector 16 as illustrated by the arrow 66 in FIG. 5. Alternatively, the battery carriage 22 can be pivoted out of the battery housing 18 as illustrated by the arrow 68 in FIG. 6 for disconnecting the battery 12 from the battery connector 16. Once the battery 12 is disconnected from the battery connector 16, the battery carriage 22 is slid out of the battery housing 18 as illustrated by the arrow 70 in FIG. 4. Finally, a person can remove the battery 12 from the battery carriage 22 by placing his or her finger through the hole 58 in the endwall 48 for dislodging the battery 12 from the battery carriage 22.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An apparatus for replacing a battery in a battery powered device having a battery connector, the apparatus comprising:

a battery housing for receiving a battery therein, the battery housing presenting an upper end adjacent the battery connector, a lower end spaced from the device, and a side opening; and means for inserting and removing the battery through the side opening of the battery housing, the means including
an elongated rod, and
a battery carriage having a lower end attached to one end of the rod, an upper end, and a battery-carrying chamber for carrying the battery, the battery carriage being adapted for sliding in and out of the side opening of the battery housing for permitting a battery to be inserted into and removed from the battery housing.

2. The apparatus as set forth in claim 1, the battery carriage including a base, a pair of upstanding, spaced-apart sidewalls an upstanding endwall, and an open endwall, the sidewalls and endwalls defining the battery-carrying chamber.

3. The apparatus as set forth in claim 2, the battery carriage further including a pair of retaining lips attached to the upper ends of the sidewalls, the retaining lips defining a slot therebetween extending across the upper end of the carriage between the endwall and the open endwall for exposing the terminals of the battery carried in the carriage, the slot permitting the battery terminals to be connected to the battery connector while the battery is in the carriage and permitting the carriage to be slid out of the side opening of the battery housing after the battery has been connected to the battery connector.

4. The apparatus as set forth in claim 3, the battery-carrying chamber presenting an interior size approximately equal to the size of the battery for securely retaining the battery therein for preventing the battery from shifting along the longitudinal axis of the carriage while the battery is being removed from the battery connector.

5. The apparatus as set forth in claim 3, the end wall presenting a hole therein for permitting a person's finger to pass therethrough for dislodging a battery from the battery carriage.

6. The apparatus as set forth in claim 1, the battery housing including a pair of spaced-apart depending sidewalls, a depending endwall, and a bottom wall, the bottom wall presenting a slot extending between the endwall and the side opening for permitting the elongated rod to pass through the slot for permitting the battery carriage to slide in and out of the side opening of the battery housing.

7. A battery-operated device comprising:

a base for fastening to a ceiling;

electrical detecting means for detecting an environmental condition;

a battery connector fixed to the base and electrically coupled with the electrical detecting means;

a battery housing depending from the base for receiving a battery therein, the battery housing presenting an upper end adjacent the battery connector, a lower end spaced from the base, and a side opening; and means for inserting and removing the battery in the battery housing, the means including
an elongated rod, and
a battery carriage having a lower end attached to one end of the rod, an upper end, and a battery-carrying chamber for carrying the battery, the battery carriage being adapted for sliding in and out of the side opening of the battery housing for permitting a battery to be inserted and removed from the battery connector.

8. The apparatus as set forth in claim 7, the battery carriage including a base, a pair of upstanding, spaced-apart sidewalls an upstanding endwall, and an open endwall, the sidewalls and endwalls defining the battery-carrying chamber.

9. The apparatus as set forth in claim 8, the battery carriage further including a pair of retaining lips attached to the upper ends of the sidewalls, the retaining lips defining a slot extending across the upper end of the carriage between the endwall and the open endwall for exposing the terminals of the battery carried in the carriage, the slot permitting the battery terminals to be connected to the battery connector while the battery is in the carriage and permitting the carriage to be moved out of the side opening of the battery housing after the battery has been connected to the battery connector.

10. The apparatus as set forth in claim 9, the battery-carrying chamber presenting an interior size approximately equal to the size of the battery for securely retaining the battery therein for preventing the battery from shifting along the longitudinal axis of the carriage while the battery is being removed from the battery connector.

11. The apparatus as set forth in claim 9, the endwall presenting a hole therein for permitting a person's finger to pass therethrough for dislodging a battery from the battery carriage.

12. The apparatus as set forth in claim 7, the battery housing including a pair of spaced-apart depending sidewalls, a depending endwall, and a bottom wall, the bottom wall presenting a slot extending between the endwall and the side opening for permitting the elongated rod to pass through the slot for permitting the battery carriage to slide in and out of the side opening of the battery housing.

* * * * *